United States Patent
Xiao et al.

(10) Patent No.: US 12,531,457 B2
(45) Date of Patent: Jan. 20, 2026

(54) SUPERCONDUCTING MOTOR WITH REDUCED COIL STRESS

(71) Applicant: Hinetics LLC, Champaign, IL (US)

(72) Inventors: Jianqiao Xiao, Champaign, IL (US); Kiruba S. Haran, Champaign, IL (US); Thanatheepan Balachandran, Urbana, IL (US); Justin Fiore, Chicago, IL (US)

(73) Assignee: Hinetics LLC, Champaign, IL (US)

( * ) Notice: Subject to any disclaimer, the term of this patent is extended or adjusted under 35 U.S.C. 154(b) by 302 days.

(21) Appl. No.: 18/220,510

(22) Filed: Jul. 11, 2023

(65) Prior Publication Data

US 2024/0014709 A1    Jan. 11, 2024

Related U.S. Application Data

(60) Provisional application No. 63/368,116, filed on Jul. 11, 2022.

(51) Int. Cl.
*H02K 9/10* (2006.01)
*H02K 5/02* (2006.01)
*H02K 9/06* (2006.01)

(52) U.S. Cl.
CPC .............. *H02K 9/10* (2013.01); *H02K 5/02* (2013.01); *H02K 9/06* (2013.01)

(58) Field of Classification Search
CPC ............ H02K 3/47; H02K 15/08; H02K 3/46; H02K 55/04; H02K 7/14; H02K 9/10
USPC .............................................. 310/52, 179, 54
See application file for complete search history.

(56) References Cited

U.S. PATENT DOCUMENTS

| 4,184,089 A * | 1/1980 | Sterrett ................. H02K 55/04 310/91 |
| 6,489,701 B1 * | 12/2002 | Gamble .................. H02K 3/24 310/55 |
| 2009/0229291 A1 * | 9/2009 | Winn ..................... F03D 80/60 310/58 |
| 2018/0375419 A1 * | 12/2018 | Rebsdorf ................ H02K 1/30 |

FOREIGN PATENT DOCUMENTS

| CN | 103501104 A * | 1/2014 | .......... H02K 7/1838 |
| KR | 101513816 B1 * | 4/2015 | ............. H02K 55/04 |

* cited by examiner

*Primary Examiner* — Jose A Gonzalez Quinones
(74) *Attorney, Agent, or Firm* — Boyle Fredrickson S.C.

(57) ABSTRACT

A lightweight superconducting machine provides a coil support shell having a polygonal outer surface facilitating the use of flat electrical coils better adapted to superconducting temperatures. An improved mounting of spokes between the rotor and shell provides for a straight spoke extent reducing stress concentration facilitated by a ball joint termination of the spoke and in-line orientation of a tightening mechanism.

15 Claims, 5 Drawing Sheets

SUPERCONDUCTING MOTOR WITH REDUCED COIL STRESS

CROSS REFERENCE TO RELATED APPLICATION

This application claims the benefit of US provisional application 63/368,116 filed Jul. 11, 2022, and hereby incorporated by reference.

BACKGROUND OF THE INVENTION

The present invention relates to high-power-to-weight electric motors for aerospace applications, and in particular to a superconducting electric motor having a spoke support system for the rotor.

Electric motors for aerospace applications, for example, for use in aircraft, desirably provide a high specific power, that is high-power output with light weight. Currently produced wound-field synchronous motors can provide about two kilowatts of power per kilogram of weight with a nominal efficiency of about 90 percent. Recent advances using permanent magnets have achieved specific power in excess of 13 kilowatts per kilogram with efficiencies in excess of 96 percent; however, the fault tolerance of such permanent magnet systems has not been established.

Desirably, the permanent magnets of such electric motors could be replaced with superconducting coils to provide improved efficiency and lighter weight (i.e., greater specific power). The substantial demands of cryogenic cooling sufficient to cool such motors, however, present a significant challenge because of the weight, complexity, and bulk of such coolers and the necessary plumbing for fluids used for heat transfer between the motor and the cooler.

U.S. patent application Ser. No. 17/498,294 filed Oct. 11, 2021, and assigned to the assignee of the present invention describes an electric motor design with greatly reduced cooling demands possible by confining the cooling to the rotor (which may be isolated in a rotor-specific vacuum envelope) and minimizing heat transfer between the rotor and the rotor shaft or other structures by suspending the rotor on the rotor shaft with high thermal resistance tensile spokes. The resulting reduced heat flow allows direct conductive cooling of the rotor coils using a cryocooler, for example, extending partially into the shaft and communicating with the coils through radially-extending conductive straps.

SUMMARY OF THE INVENTION

The present invention provides an improved coil form and improved spoke mounting for the above described design reducing potential damage to the spokes and coils. An improved spoke construction better balances the trade-offs between damping and heat generation, and an arrangement of the cryocoolers for improved cooling is provided.

In one embodiment, the invention provides a superconducting machine having a stator and a rotor, the latter having a central shaft rotatably mounted with respect to the stator to allow the rotor to rotate about a shaft axis with respect to the stator. The rotor includes a rotor shell suspended about the shaft by a tension among flexible spokes passing between the rotor shell and the shaft. The rotor shell has a polygonal outer circumference presenting a set of circumferentially displaced flat regions with a set of superconducting windings positioned on the rotor shell individually aligned within the flat regions.

It is thus a feature of at least one embodiment of the invention to provide a supporting shell structure that eliminates a twisting of the superconducting wire that can occur when it is formed both in a coil and around the cylindrical shell.

The superconducting machine may further include a set of circumferential ribs extending radially inward from an inner surface of the rotor shell, an outer periphery of the circumferential ribs conforming to a polygonal inner circumference of the rotor shell and an inner periphery of the circumferential ribs being circular.

It is thus a feature of at least one embodiment of the invention to spread and divert the high hoop stresses that can occur in a noncircular shell at high speeds.

The ribs may be spaced axially with an increasing spacing toward an axial center of the rotor.

It is thus a feature of at least one embodiment of the invention to minimize rotor weight and inertia by minimizing the ribs to increase support of the shell preferentially toward its ends.

The flexible spokes may extend exclusively in a straight line between a connection point at the rotor shell and a connection point at the rotor.

It is thus a feature of at least one embodiment of the invention to eliminate shear forces on the spokes such as may cause premature failure.

The spokes maybe a mixture of fibers having different loss factors describing heat generated during stretching and may have a varying cross-section along their length.

It is thus a feature of at least one embodiment of the invention to adjust the characteristic of the spokes to better accommodate the extreme temperature gradient along the spokes occurring with cryogenic cooling of the coils.

The flexible spokes may terminate at either the rotor or shell at a ball joint operating to rotate with a direction of tension on the spoke.

It is thus a feature of at least one embodiment of the invention to preserve a straight line tension on the spoke with dimensional changes caused by cooling of the shell or the like.

In some embodiments, the invention may provide a cryocooler centered on the shaft axis and an impeller attached to the rotor to expel air radially to draw air flow across a hot end of the cryocooler.

It is thus a feature of at least one embodiment of the invention to make use of rotor rotation to provide cooling airflow over the hot end of the cryo-cooler.

In one embodiment, the superconducting machine may include multiple cryocoolers extending radially from the rotor with a cold end of the cryocooler closest to the shell wherein the shell and the cold end of the cryocoolers are contained in a separate evacuated compartment from the rotor.

It is thus a feature of at least one embodiment of the invention to permit the use of a smaller vacuum envelope and shorter spokes and conductors from the cryocooler to the shell to minimize weight and improve efficiency.

These particular objects and advantages may apply to only some embodiments falling within the claims and thus do not define the scope of the invention.

DETAILED DESCRIPTION OF THE PREFERRED EMBODIMENT

Figure 1:
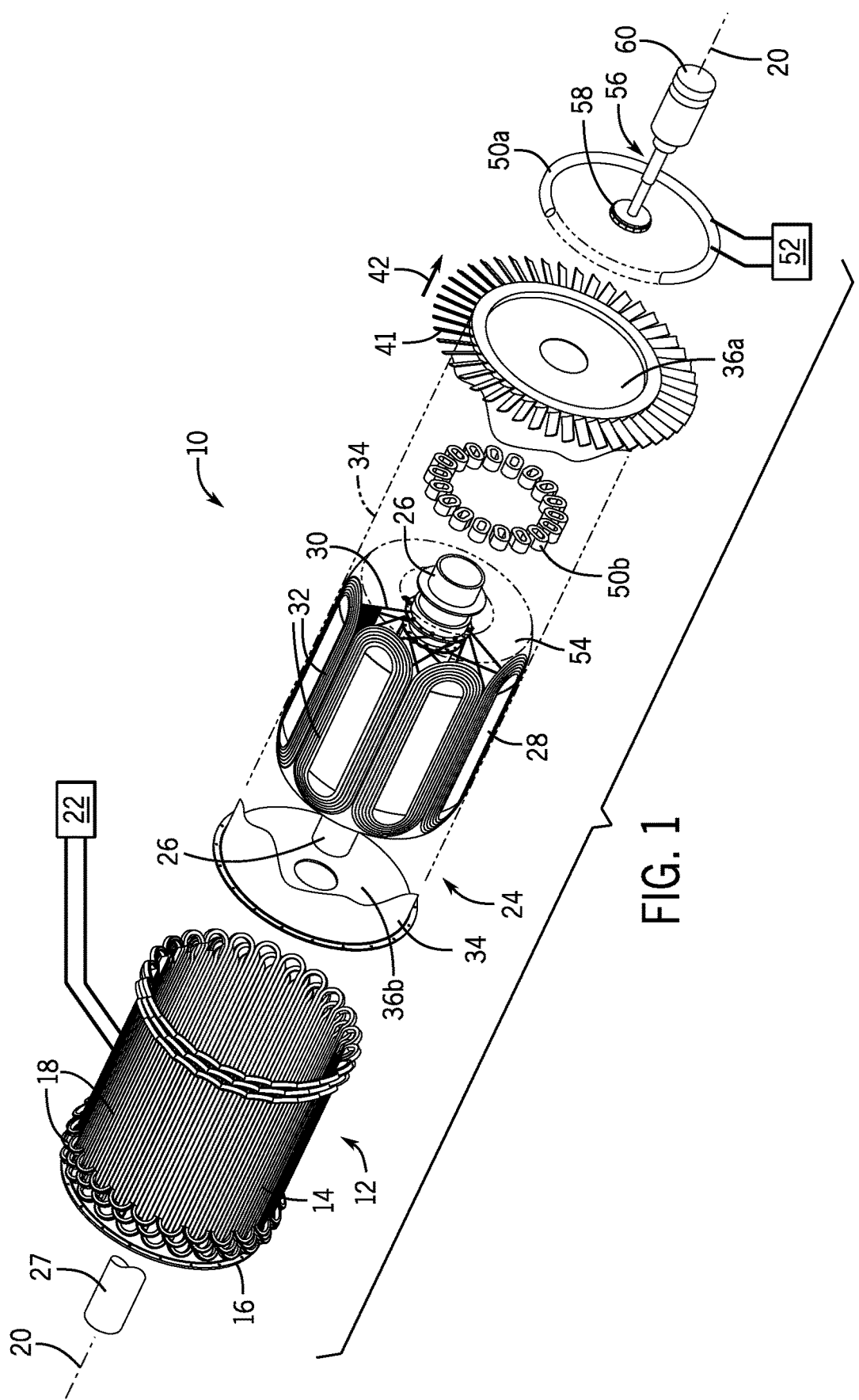
FIG. 1 is a simplified exploded view of the principal components of a motor constructed according to the present invention including a stator and a concentrically rotating wound-field rotor within a vacuum envelope.

Referring now to FIG. 1, a superconducting motor 10 per the present invention may include a stator 12 providing, in one embodiment, a generally cylindrical, tubular stator form 14 having an outwardly flared end 16. A set of stator coils 18 may be attached to an inner surface of the stator form 14 spaced angularly about an axis 20 of the stator form 14 and extending between its opposite ends to provide a radially directed magnetic axis. The stator coils 18 may be air-core coils stabilized in a potting material as attached to the stator form 14 and may communicate with a motor drive circuit 22, for example, sequentially energizing the stator coils 18 to create a rotating magnetic field about the axis 20 as is generally understood in the art.

Fitting within the stator form 14 to rotate therein about the axis 20 is a rotor 24 providing a tubular rotor shaft 26 that may communicate beyond the confines of the motor 10 as a driveshaft 27 connected, for example, to turbine or propeller systems of aircraft or the like (not shown). The rotor shaft 26 may be supported for rotation on bearings generally understood in the art.

Figure 2:
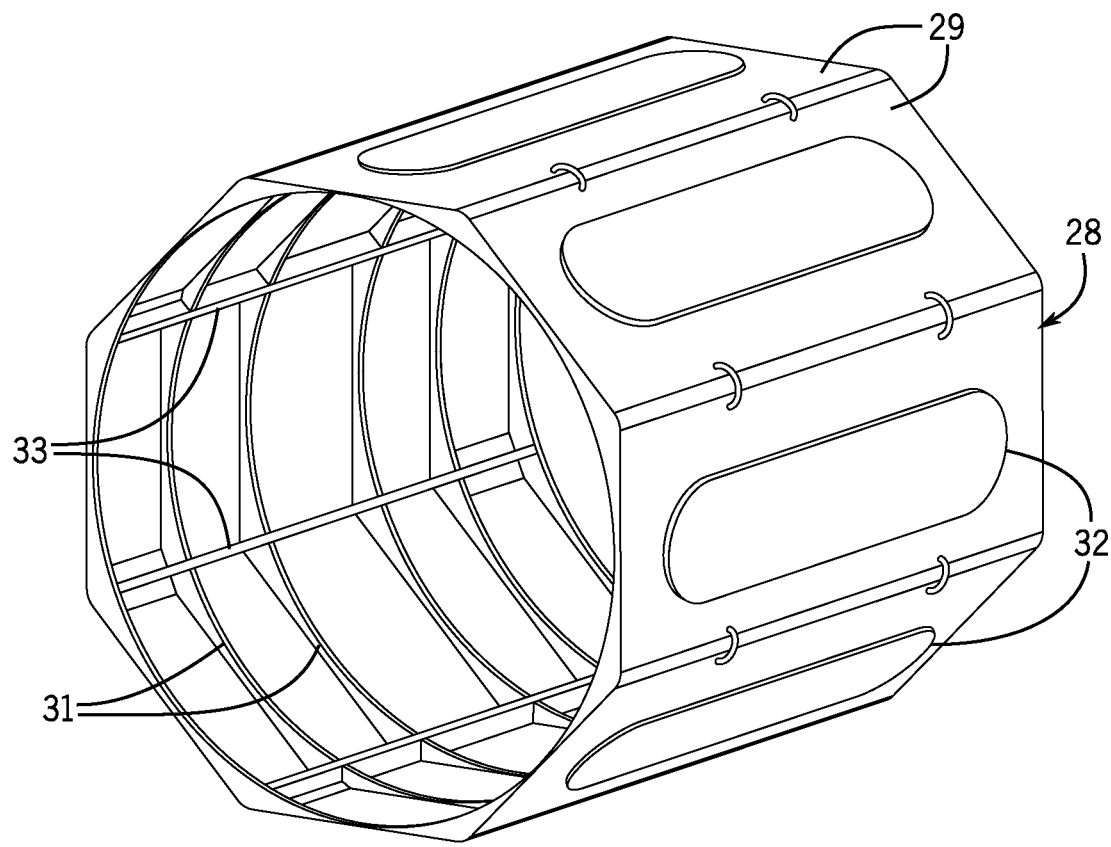
FIG. 2 is a perspective view of a rotor shell providing improved coil mounting surfaces.

Referring also to FIG. 2, a rotor shell 28 is positioned concentrically around the shaft 26 and held for co-rotation with the shaft 26 by a set of thermally insulated spokes 30 radiating outwardly from the shaft 26 as will be discussed in more detail below. The rotor shell 28 may be a polygonal tube, for example, having an inner and outer circumference describing rotationally aligned regular polygons of cross-section, for example, with eight planar faces. The shell 28 may be constructed of 29 of aluminum or other lightweight material, to have low weight and low moment of inertia and will typically have a radial thickness of less than 100th of the radius of the shell 28 from the axis 20. A set of ribs 31 extending circumferentially in a ring about the axis 20 may have an outer polygonal periphery conforming to the polygonal shape of the inner surface of the rotor shell 28 and attached thereto, and an inner circular periphery providing good resistance to circumferential tension. The ribs may be spaced axially, for example, with a closer spacing toward the axially opposed ends of the shell 28 and may be joined by axially parallel stiffener struts 33.

An outer surface of the rotor shell 28 includes a set of rotor coils 32 having an elongate racetrack shape and, more specifically, following the shape of a geometric stadium being a rectangle with semicircles at opposite ends, with a longest dimension extending between axial ends of the rotor shell 28. The rotor coils 32 will be spaced circumferentially around the rotor shell 28 and centered within the faces 29 at equal angular intervals and may be air-core planar coils, the latter term, as used herein, meaning that the coils are substantially two-dimensional being wound helically in one or a limited number of layers to conform to a surface. Generally, the rotor coils 32 will be high-temperature superconductive materials so as sustain a strong magnetic field without significant power consumption in the manner of a permanent magnet but with much lower mass and hence weight. Generally the rotor coils 32 may be infused with a stabilizing polymer or epoxy material.

As so mounted, the rotor coils 20 may be substantially constrained to a single plane allowing bending of the conductors of the rotor coils but reduced twisting.

The stator coils 18 and rotor coils 32 may be integrated with sensors, for example, strain and temperature sensors, that may be wirelessly monitored, for example, to detect quenching or imminent failure. An electromagnetic shield, for example, of a conductive material such as copper or aluminum may surround the outer surface of the rotor coils 32, for example, as part of the vacuum shield to reduce losses caused by non-synchronous electromagnetic fields.

Referring again to FIG. 1, a cylindrical vacuum envelope 34 closely surrounds the stator shell 28 and includes end caps 36a and 36b providing bases to the cylinder and sealing the ends of the vacuum envelope 34 against the outer circumference of the shaft 26 to provide an airtight volume 38 that may be evacuated to reduce convective heat loss between the shell 28 and outside structures of the motor and between the shell 28 and the shaft 26. End cap 36b may have a radially outwardly extending impeller 41 pulling air, as indicated by airflow 42, over the outer surface of the stator form 14 for cooling of the same as the rotor 24 rotates.

Positioned on either side of end cap 36a are wireless transmission coils 50a and 50b forming primary and secondary windings of a transformer for transferring power through the vacuum envelope 34 without breach thereof to provide excitation power to the rotor coils 32. Coil 50 may be energized by a high-frequency power source 52, and coil 50b may communicate with the rotor coils 32 by means of a power conditioner 54 providing solid-state rectification and filtering of the alternating current transferred between the transmission coils 50a and 50b to produce the necessary DC voltages for the rotor coils 32. Other systems for wirelessly providing current to the coils 32 include contactless flux pumps of a type known in the art.

Figure 3:
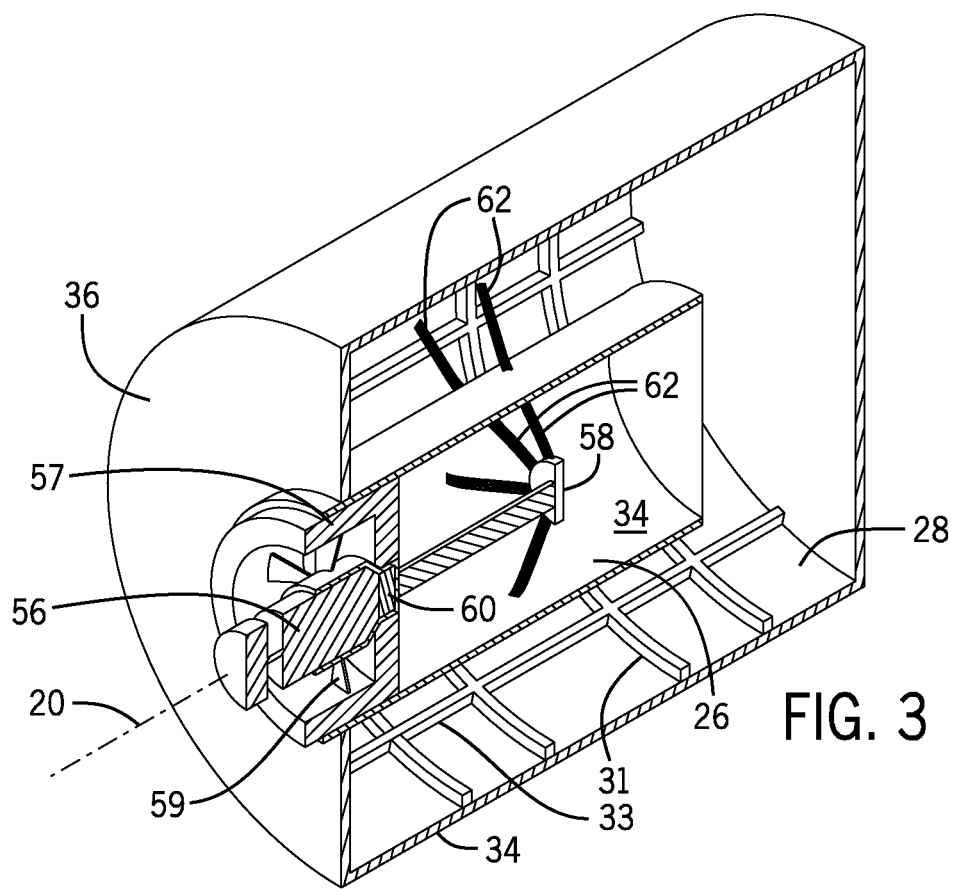
FIG. 3 is a vertical plane perspective cross-section of the motor of FIG. 1 showing a cooling impeller placed around the hot end of the cryocooler for improved cooling, with an inset showing the impeller in cross-section.
Figure 4:
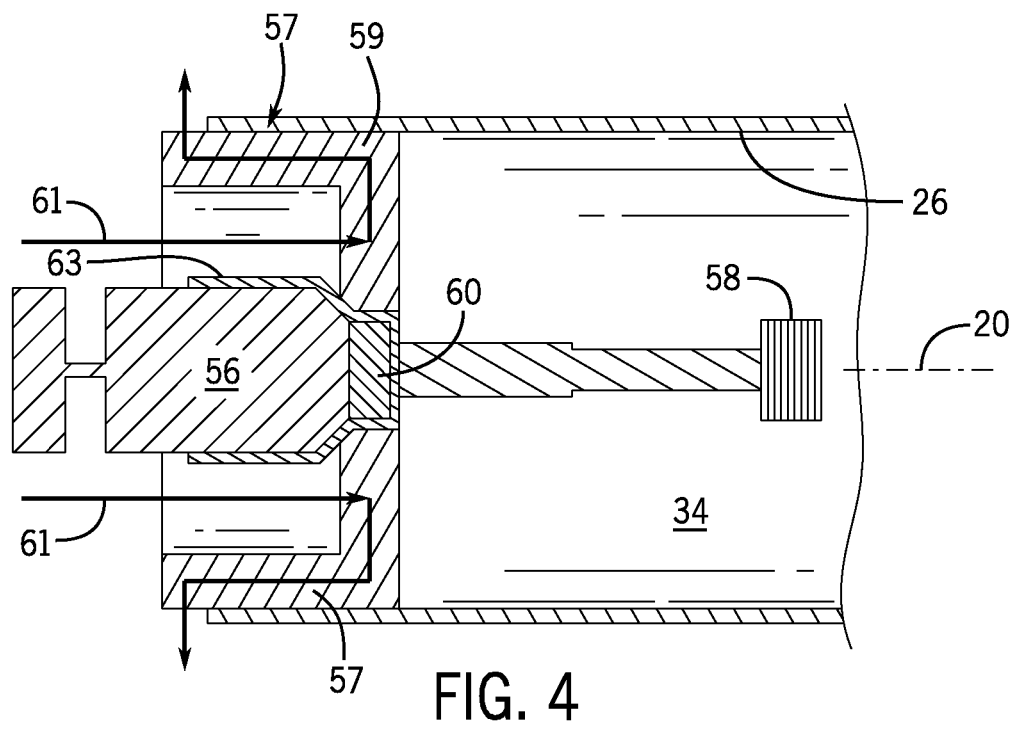
FIG. 4 is a vertical cross-section of the impeller system of FIG. 3 showing airflow and improved heat conduction through the addition of a heat pipe.

Referring now to FIGS. 1, 3, and 4, in one of multiple embodiments, a cryocooler 56 may extend along the axis 20 and have a cold end 58 passing into the hollow tubular shaft 26 to be roughly centered within the ends of the rotor 24 and attached to the shaft 26 by insulating supports to rotate therewith. A hot end 60 of the cryocooler 56 may extend outside of the vacuum envelope 34 and be fixed to a stationary structure so that rotation between the cold end 58 and hot end 60 may drive a sterling cycle heat pump pumping heat from the cold end 58 to the hot end 60 (at ambient temperatures) to bring the temperature of the cold end 58 to cryogenic temperatures of less than 50° Kelvin. Cryocoolers 56 suitable for use with the present invention are commercially available, for example, from the Sunpower Division of AMTEK of Berwyn, Pennsylvania, under the trade name CryoTel GT.

Referring now to FIGS. 1, 3, and 4, thermally conductive straps 62 extend radially at equal angles about the cold end 58 to be thermally connected to axially extending thermal leads 64 attached to the inner surface of the rotor shell 28 and serving to draw heat from the motor coils 32 to the cold end 58. Generally, the conductive straps 62 pass through openings in the shaft 26 to be thermally insulated therefrom. The material of the conductive straps 62 may, for example, be a conductive metal such as copper and may be flexible to accommodate thermal contractions during cool down of the rotor shell 28. Operation of the cryocooler 56 brings the rotor coils 32 down to cryogenic temperatures of less than 50K suitable for providing superconductivity in the coils 32, or temperatures of less than 77° Kelvin suitable for high temperature superconductivity.

The hot end 60 of the cryocooler 56 extending outside of the vacuum envelope 34 may be encircled by an impeller 57 attached to rotate with the shaft 26 and thus with respect to the hot end 60 to draw cooling air 61 past the hot end 60 during operation of the motor 10. The impeller 57 may have a set of radially extending blades 59 centrifugally driving air radially outwardly after having passed by the hot end 60 outside of the vacuum envelope and end cap 36. Heat pipe 63 may extend out from the hot end 60 into the path of cooling air 61 to improve heat transfer given the axial displacement of the impeller 57.

Figure 5:
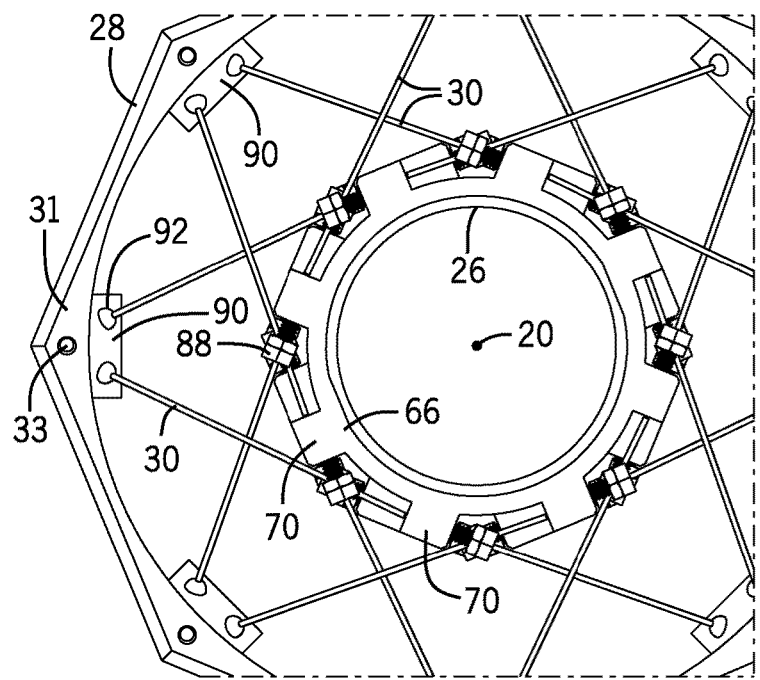
FIG. 5 is a fragmentary, front elevational view of the spoke system of the present invention showing a mounting system eliminating deflection of the spokes between their connection points at ferrules.
Figure 6:
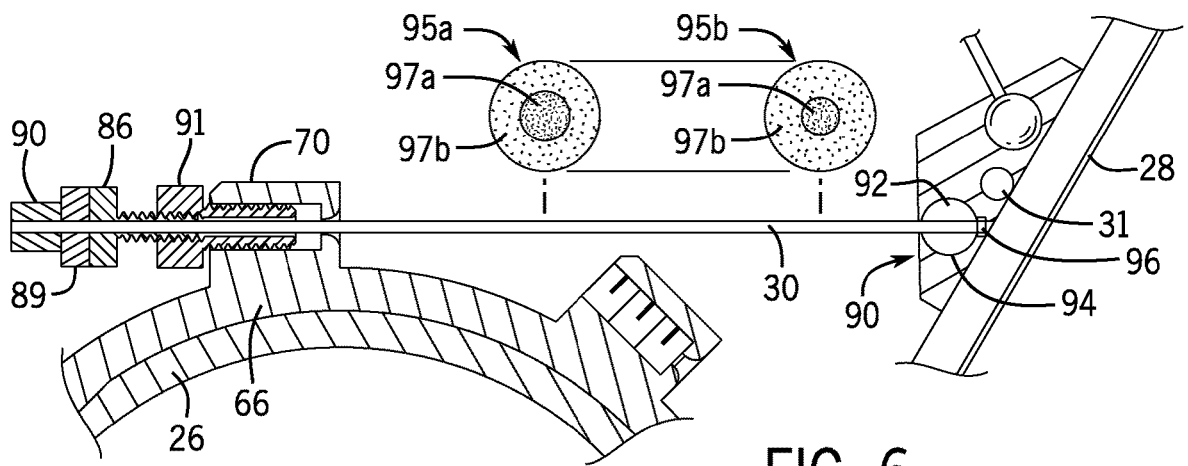
FIG. 6 is a cross-section of a single spoke in isolation showing a threaded tensioner and a ball terminator at opposite ends of the spoke and a varying spoke composition and dimension.
Figure 7:
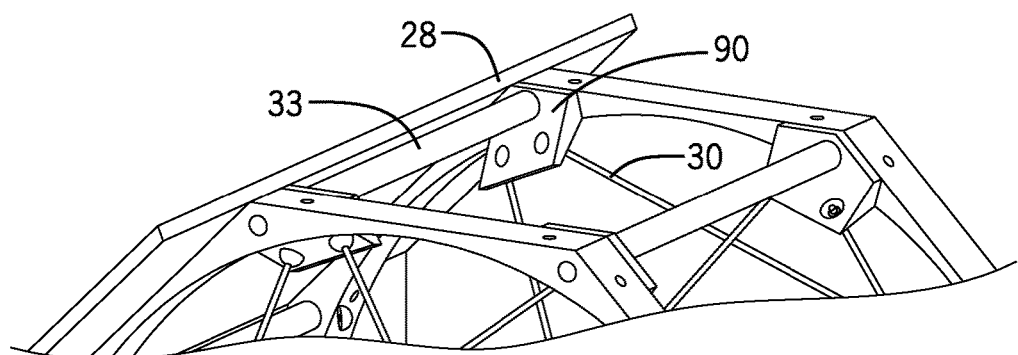
FIG. 7 is a fragmentary perspective view of the ball terminator of FIG. 6 as attached to the shell wall.

Referring now to FIGS. 1, 5 and 6, the spokes 30 may attach to spoke terminal rings 66 affixed to the rotor shaft 26 at opposite ends of the rotor 24 with the spokes 30 passing substantially tangentially from the rotor 26 away from the axis 20 for maximum torsion resistance and reduced tensile forces. The spokes 30 are angled in opposite directions (clockwise and counterclockwise) away from axially extending and radially extending planes through the shaft 26 about the axis 20 and also extend inwardly toward the center of the rotor 24 along the axis away from radially extending planes normal to the axis 20 to provide resistance against axial motion between the shaft 26 and the shell 28 thereby reducing cooling load.

The spoke terminal ring 66 provides a set of radially protruding internally threaded sleeves 70 each having a bore axis angled such as to allow the spoke 30 to extend between the rotor 26 and the shell 28 in a straight line eliminating kinks or bends that would concentrate shear stresses on the spokes 30 reducing their resistance to damage. The threaded sleeve 70 for each spoke 30 may receive an externally threaded tubular collar 86 having matching threads engaging the threaded sleeve 70 and a protruding end 88 having wrench flats 89 or the like. The spoke 30 passes through the tubular collar 86 and past the protruding end 88 where the spoke 30 has a formed or crimped on ferrule 96 larger than the opening in the tubular collar 86 and providing a first connection point to the rotor 26. In this way, a rotation of the tubular collar 86 may change the spacing between the opposing surface of the threaded sleeve 70 and the protruding end 88 thereby allowing adjustment of tension of the spoke 30. A lock nut 91 fitting around a threaded portion of the threaded tubular collar 86 may be tightened against the corresponding surface of the threaded sleeve 70 to lock the assembly against rotation and vibration.

The opposite end of the spoke 30 near the shell 28 may be received by a ball joint 90 providing for a spherical ball 92 fitting in a corresponding socket 94 to rotate therein. The spoke 30 may pass through a hole through the center of the ball 92 to be retained by a ferrule 96 or the like on its opposite side and providing a second connection point to the shell 28 such as resists its tensile forces. This ball joint 90 allows natural alignment of the ball 92 with the force on the spoke 30 again maintaining the spoke 30 in a straight configuration for reduced stresses even against dimensional changes in the structures holding the spoke 30 at cryogenic temperatures. The socket 94 may be attached to a rib 31 and be given additional support by struts 33.

The spokes 30 desirably provide balanced low thermal conduction, high tensile strength, and vibration damping and for this purpose may be constructed of a combination of different materials having different thermal conduction, tensile strength, and vibration damping including Kevlar™ (Poly (azanediyl-1,4-phenyleneazanediylterephthaloyl)), nylon, polyethylene, carbon fiber, glass fiber, metals or the like including materials generally having a Young's modulus of no less than substantially 70 GPa and a thermal conductivity of less than 2 W/mK or less than 0.5 W/m-k in some embodiments. Importantly, the spokes 30 should have a high-yield strength to thermal conductivity, for example, greater than 10,000,000

$$\frac{\sigma_{ys}}{k},$$

where $\sigma_{ys}$ is measured in MPa and K as W/m/k.

Desirably at least two different fiber types 97a and 97b will be combined together in a composite spoke 30, the fiber types having different loss factors describing the conversion of vibration energy in the heat according to the hysteresis properties of its stress-strain properties. The selection of these materials is made to reduce the internally generated spoke-heat that is flowing into the rotor as much as possible., for example, two different types of tensile members may be used such as polymer fibers, such as Kevlar™, having higher loss factors combined with carbon fiber having lower loss factors. Other combinations of polymer and metal may be employed. The cross-sectional dimension, shown by cross-sections 95a and 95b of the spoke 30 may vary along the length of the spoke 30 by at least 5% as well as the composition of the spoke (by ratio change of at least 5%), for example, from different tensile fibers to be optimized for different points in the extreme temperature gradient along spokes 30. The combination of different filament types may be implemented by combining filaments in parallel at a filament level before braiding. Alternatively, braids of a given filament type may be created and then combined by additional braiding.

It is generally contemplated that the spokes 30 may be a blended material, possibly with inter-mingled fibers, uninterrupted in their communication between the rotor shell 28 and the rotor 26; however it will be appreciated that a multi segment spoke 30 may also be used, for example, having different materials along its length, for example, a material with higher thermal conductivity interrupted by short intervals of thermally blocking material or the like, and thus that the bulk properties of the spokes 30 must be considered with respect to the limitations and designs described herein. The spokes 30 are generally flexible but provide rigid connection between the shaft 26 and shell 28 by means of tension which may be set to accommodate contraction of the shell 28 after assembly and cooling to cryogenic temperatures. Generally, the spokes 30 will be flexible, for example, and bend by more than 20° when held horizontally at one end and extend horizontally over distance of 1 m.

During manufacture, the spokes 30 may be preloaded statically to less than half of their yield stress so that they have capacity to resist torsion during use. This pre-tensioning is in part caused by the cool down of the rotor shell 28 which may be calculated and used for this purpose in determining the static tensioning.

Figure 8:
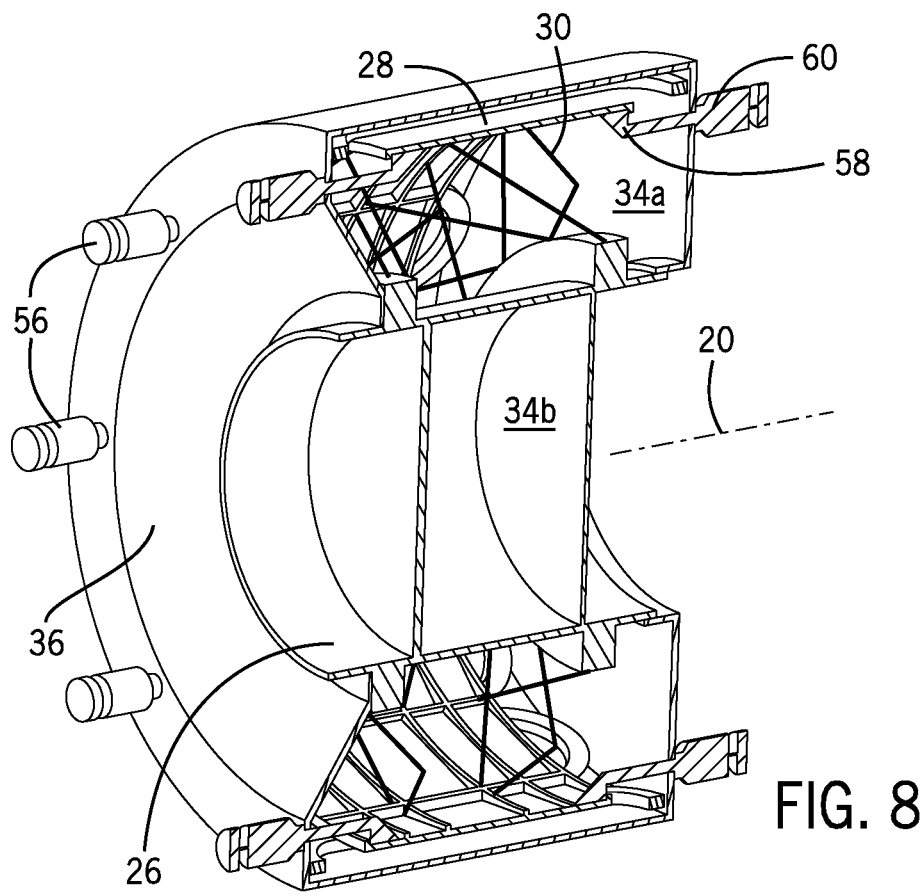
FIG. 8 is an alternative embodiment of the motor with the cryocoolers positioned near a periphery of the shell minimizing spoke length and length of connecting straps to the cryocooler cold ends.
Figure 9:
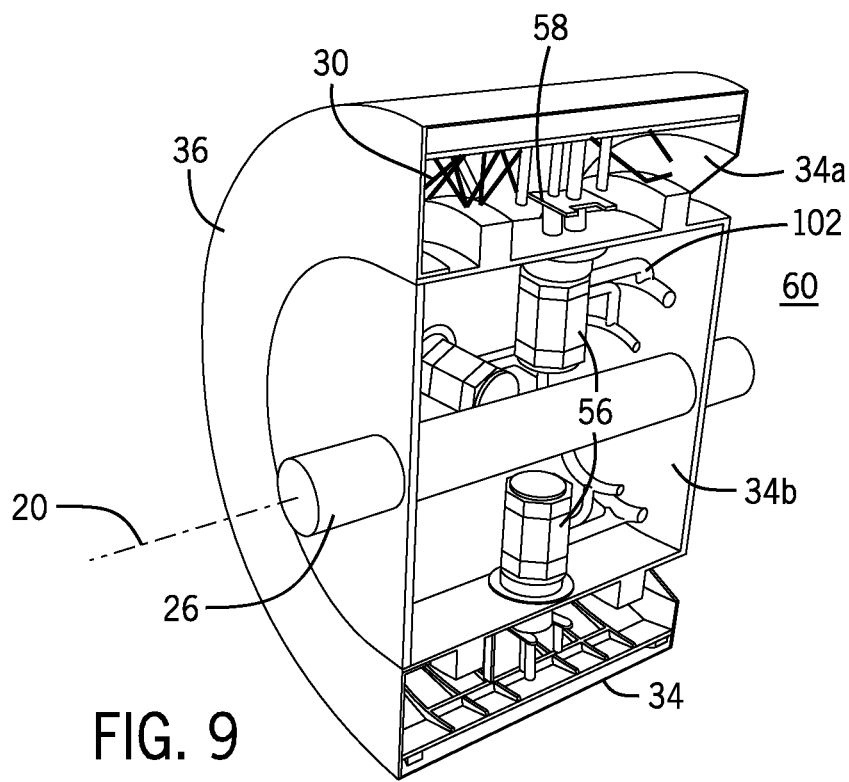
FIG. 9 is an alternative embodiment with the cryocoolers aligned along the lines of radius from the axle.

Referring now to FIGS. 8 and 9, the vacuum envelope 34 may be separated into an outer vacuum envelope 34a and an inner vacuum envelope 34b. The outer vacuum envelope 34a holds the shell 28 supporting the coils 32 and the spokes 30 and fits concentrically around the inner vacuum envelope 34b, the latter surrounding the rotor 26. In the configuration of FIG. 8, a set of cryocoolers 56 may extend through the end caps 36 extending generally parallel to the axis 20 and separated circumferentially to communicate between their cold ends with coils 32 within the outer vacuum envelope 34a. These cryocoolers 56 may be driven by electric motors (fed through an inductive coupler). This design may be beneficial for slower moving motors or generators, for example, associated with wind turbines and greatly reduces the path of conduction from the cryocooler cold end 58 to the shell 28 and reduces the length of the spokes 30 and reduces the size of the outer vacuum envelope 34a making it easier to hold a hard vacuum. In some embodiments, the radial distance traversed by the spokes 30 may be less than two thirds or less than half the radial distance between the axis 20 and the outer surface of the shell 28.

In the configuration of FIG. 9, a set of cryocoolers 56 may be positioned to extend radially between the inner vacuum envelope 34b and outer vacuum envelope 34a, the latter holding the cold end 58 of the cryocooler 56. Piping 102 may conduct refrigerant from the hot end to outside of the vacuum envelope 34 for discharge at the compressor (not shown) which may be cooled by external fans attached to the rotor shaft 26.

The principles and structures described above may be readily adapted to an outer rotor design in which the rotor 24 rotates outside of the stator 12 with the rotor coils 32 surrounding and outside of the stator coils 18. In this case, the vacuum envelope 34 provides an airtight volume 38 in the form of a cylindrical annulus centered about the axis 20. Spokes 30 may pass from an outer wall of the vacuum envelope 34 inwardly to the shell 28 to provide, in tension, support for the shell 28 as will be thermally isolated from the walls of the vacuum envelope 34. The cryocooler 56 may be attached to the vacuum envelope 34 to rotate therewith and be provided with power by means of inductively coupled coils 80 receiving power through a stationary power source in the manner of coils 50 described above. The cold end 58 of the cryocooler 56 may directly contact the shell 28 or may communicate thermally through intermediate conductors or the like. In this design, torque is transmitted through the walls of the vacuum envelope 34 to the shaft 26.

In addition, while the above description is generally focused on the construction of a motor, it will be appreciated that the same principles will produce an electrical generator and thus the invention generally involves an electrical machine rather than a motor or generator particularly.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A superconducting machine comprising:
   a stator; and
   a rotor having a central shaft rotatably mounted with respect to the stator to allow the rotor to rotate about a shaft axis with respect to the stator, wherein the rotor includes:
   a rotor shell suspended about the shaft by a tension among spokes passing between the rotor shell and the shaft, the rotor shell having a polygonal outer circumference presenting a set of circumferentially displaced flat regions;
   a set of superconducting windings positioned on the rotor shell aligned within the flat regions; and
   a cryogenic cooling system positioned within the rotor shell to conduct heat inwardly toward the central shaft.

2. The superconducting machine of claim 1 wherein the polygonal outer circumference is a regular polygon and each of the superconducting windings presents a coil wound in a planar stadium shape.

3. A superconducting machine comprising:
   a stator; and
   a rotor having a central shaft rotatably mounted with respect to the stator to allow the rotor to rotate about a shaft axis with respect to the stator, wherein the rotor includes:
   a rotor shell suspended about the shaft by a tension among spokes passing between the rotor shell and the shaft, the rotor shell having a polygonal outer circumference presenting a set of circumferentially displaced flat regions; and
   a set of superconducting windings positioned on the rotor shell aligned within the flat region;

further including a set of circumferential ribs extending radially inward from an inner surface of the rotor shell, an outer periphery of the circumferential ribs conforming to a polygonal inner circumference of the rotor shell and an inner periphery of the circumferential ribs being circular.

4. The superconducting machine of claim 3 wherein the ribs are spaced axially with an increasing spacing toward an axial center of the rotor.

5. The superconducting machine of claim 1 wherein the spokes extend exclusively in a straight line from a connection point at the rotor shell to a connection point at the rotor.

6. The superconducting machine of claim 1 wherein the spokes are a mixture of fibers having different loss factors describing heat generated during stretching.

7. The superconducting machine of claim 6 wherein different fibers include a polymer fiber having a relatively high loss factor and a carbon fiber having a relatively low loss factor.

8. The superconducting machine of claim 1 wherein the spokes have a varying cross-section along their length of at least 5%.

9. The superconducting machine of claim 1 wherein the flexible spokes terminate at least one of the rotor and shell at a ball joint operating to rotate with a direction of tension on the spoke.

10. The superconducting machine of claim 1 wherein the cryogenic cooling system comprises a cryocooler centered on the shaft axis and further including an impeller attached to the rotor to expel air flow radially to pull air in thermal communication with the hot end across a hot end of the cryocooler to cool the hot end.

11. The superconducting machine of claim 10 further including a heat pipe communicating between the hot end of the cryocooler and the airflow.

12. The superconducting machine of claim 1 further including multiple cryocoolers extending radially from the rotor with a cold end of the cryocooler closest to the shell wherein the shell and the cold end of the cryocoolers are contained in a separate evacuated compartment from the rotor.

13. A superconducting machine comprising:
a stator; and
a rotor having a central shaft rotatably mounted with respect to the stator to allow the rotor to rotate about a shaft axis with respect to the stator, wherein the rotor includes:
a set of superconducting windings positioned on the rotor shell to rotate therewith;
a vacuum envelope surrounding the superconducting windings;
at least one cryocooler having a cold end in thermal communication with the superconducting windings and a hot end extending outside of the vacuum envelope along the shaft axis; and
an impeller attached to the rotor to rotate therewith and surrounding the hot end to draw air in thermal communication with the hot end over the hot end to cool the hot end.

14. A superconducting machine comprising:
a stator; and
a rotor having a central shaft rotatably mounted with respect to the stator to allow the rotor to rotate about a shaft axis with respect to the stator, wherein the rotor includes:
a set of superconducting windings positioned on the rotor shell to rotate therewith;
a vacuum envelope surrounding the superconducting windings;
multiple cryocoolers extending radially from the rotor with a cold end of the cryocooler closest to the shell wherein the shell and the cold end of the cryocoolers are contained in the vacuum envelope separate from the rotor;
wherein the cold ends of the cryocoolers communicate thermally with the superconducting windings principally by solid thermally conductive members; and
wherein the rotor shell is isolated from the rotor by spokes in tension.

15. The superconducting machine of claim 1 including a vacuum vessel providing an evacuated space between the rotor and the stator allowing the rotor to rotate without interference between its outer rotating surface and a viscous medium.

* * * * *